(12) United States Patent
Lee et al.

(10) Patent No.: US 11,328,112 B1
(45) Date of Patent: May 10, 2022

(54) TIMING-AWARE TESTING

(71) Applicant: NVIDIA Corporation, Santa Clara, CA (US)

(72) Inventors: Shang-Ju Lee, New Taipei (TW); Li-Wei Ko, New Taipei (TW); Francisco M. Da Silva, Morgan Hill, CA (US); Shyh-Horng Lin, New Taipei (TW)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/160,192

(22) Filed: Jan. 27, 2021

(51) Int. Cl.
    *G06F 30/398* (2020.01)
    *G01R 31/28* (2006.01)
    *G06F 119/02* (2020.01)

(52) U.S. Cl.
    CPC ....... *G06F 30/398* (2020.01); *G01R 31/2882* (2013.01); *G06F 2119/02* (2020.01)

(58) Field of Classification Search
    CPC .................................................... G06F 30/398
    USPC ........................................................ 716/111
    See application file for complete search history.

(56) References Cited

U.S. PATENT DOCUMENTS

2018/0045781 A1 * 2/2018 Song .................. G01R 31/2815

* cited by examiner

*Primary Examiner* — Eric D Lee
(74) *Attorney, Agent, or Firm* — Zilka-Kotab, P.C.

(57) ABSTRACT

In order to expedite testing (such as silicon chip testing), a test pattern that indicates a timing, order, and frequency (e.g., speed) of signals sent during the test may be divided into different portions. Also, a frequency at which each portion of the test pattern is to be run is determined. Each portion is run at a frequency that can be supported by only that portion. As a result, the slowest portion of the test pattern only limits the frequency at which its portion is run, while other portions are run at a faster frequency. This reduces a time taken to run the test pattern in a testing environment.

25 Claims, 6 Drawing Sheets

TIMING-AWARE TESTING

FIELD OF THE INVENTION

The present disclosure relates to performing hardware testing.

BACKGROUND

Hardware testing is commonly used to verify the integrity of a manufactured entity (e.g., a manufactured silicon computer chip). The hardware testing may test the functionality of the entity to ensure that it was manufactured correctly. However, current methods for performing hardware testing implement an entire test at a single frequency that is dictated by the slowest portions of the test. There is therefore a need to improve the performance of such test methods.

DETAILED DESCRIPTION

Testing environments such as hardware testers implement test patterns to test the functionality of various entities. For example, a hardware tester may test a recently-manufactured silicon chip by sending test signals to the chip, where a timing, order, and frequency (e.g., speed) of the signals is dictated by a test pattern. However, current test patterns are run at a frequency that can be supported by the entirety of the test pattern. As a result, the slowest portion of the test pattern limits the frequency at which the entire test pattern may be run.

In order to expedite testing, this test pattern may be divided into different portions, and a frequency at which each portion is to be run may be determined. Each portion is run at a frequency that can be supported by only that portion. As a result, the slowest portion of the test pattern only limits the frequency at which its portion may be run, while other portions may be run at a faster frequency. This may reduce a time taken to implement a test pattern.

Figure 1:
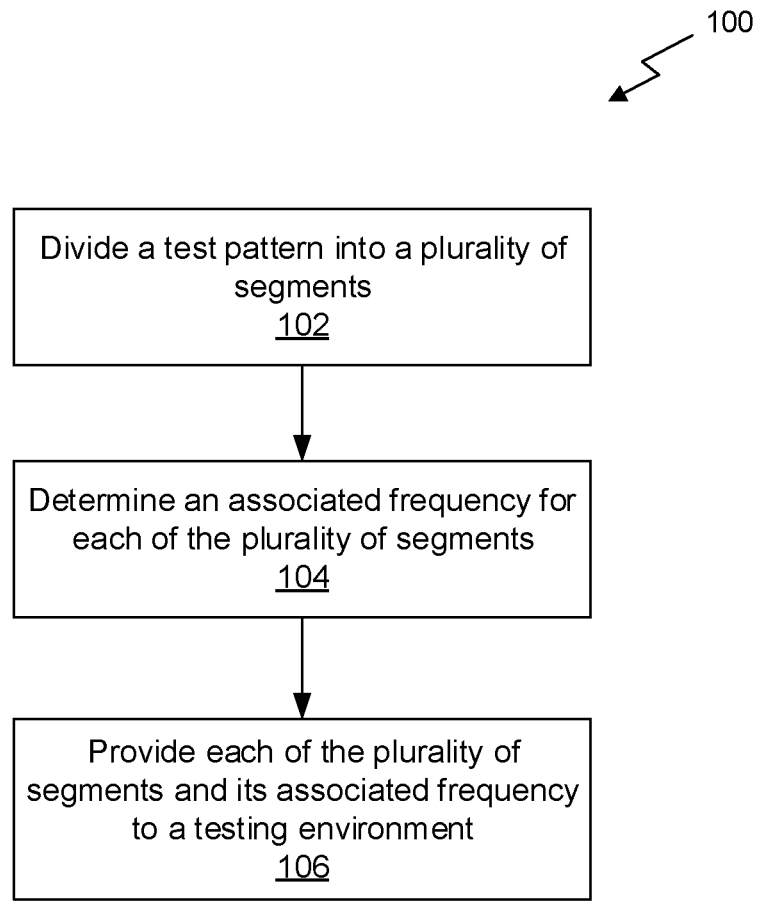
FIG. 1 illustrates a flowchart of a method of performing timing-aware testing, in accordance with an embodiment.

FIG. 1 illustrates a flowchart of a method 100 of performing timing-aware testing, in accordance with an embodiment. The method 100 may be performed the context of a processing unit and/or by a program, custom circuitry, or by a combination of custom circuitry and a program. For example, the method 100 may be executed by a GPU (graphics processing unit), CPU (central processing unit), or any processor described below. Furthermore, persons of ordinary skill in the art will understand that any system that performs method 100 is within the scope and spirit of embodiments of the present disclosure.

As shown in operation 102, a test pattern is divided into a plurality of segments. In one embodiment, the test pattern may include instructions to be provided to a testing environment. For example, the instructions may indicate procedures to be performed by the testing environment during a test, an order of such procedures, etc. In another example, the instructions may indicate which signals a hardware tester sends to an entity being tested, as well as an order and timing of such signals.

Additionally, in one embodiment, the test pattern may be associated with a single predetermined frequency. For example, the single predetermined frequency may include a speed at which information (e.g., test signals, etc.) is provided by the testing environment to the entity being tested. In another example, the frequency may be measured utilizing a predetermined reference unit (e.g., megahertz (mHz), etc.). In yet another example, the single predetermined frequency may be limited to the slowest frequency corresponding to the slowest portion of the test pattern.

Further, in one embodiment, the testing environment may include one or more hardware elements (e.g., a hardware tester, a system tester, a device tester, etc.). In another embodiment, the testing environment may test the functionality of an entity. For example, the entity may include a silicon chip such as a processor, a computing device, or any other manufactured unit of computing hardware.

Further still, in one embodiment, the testing environment may ensure the correct functionality of the entity being tested (e.g., after the entity is manufactured, etc.). In another embodiment, the testing environment may include a hardware tester that tests the functionality of a manufactured silicon chip.

For example, the test pattern may be sent (e.g., from hardware or software separate from the hardware tester or integrated into the hardware tester) to the hardware tester. In another example, the test pattern may indicate an order and timing of signals to be sent to the manufactured silicon chip. In yet another example, in response to receiving the test pattern, the hardware tester may send test signals to the manufactured silicon chip according to the test pattern. In still another example, the signals may be sent with a frequency indicated within the test pattern.

Also, in one example, the hardware tester may receive response signals from the manufactured silicon chip in response to sending the test signals. In another example, the hardware tester may compare the response signals to predetermined (e.g., threshold/expected) signals. In yet another example, the hardware tester may provide a result signal to the software that sent the test pattern, where the result signal indicates a pass or fail condition. For instance, a pass condition may occur when the response signals match the predetermined signals. In another instance, a fail condition may occur when the response signals do not match the predetermined signals.

In addition, in one embodiment, the test pattern may be analyzed to determine one or more characteristics of the test pattern. For example, the one or more characteristics may include timing paths used during different portions of the test pattern. For instance, the timing paths may include paths being accessed/used within the entity being tested (e.g., a silicon chip, etc.) during the testing of the entity using the test pattern. Exemplary timing paths may include a path from an input of entity to an internal register, a path from one internal register to another internal register, a path from an internal register to an output of an entity, a path from an input of an entity to an output of an entity, etc.

Furthermore, in one embodiment, the one or more characteristics may include portions of the entity that are active during different portions of the test pattern. In another embodiment, the test pattern may be divided into the plurality of segments based on the characteristics of the test pattern.

For example, a first portion of the test pattern may involve a first timing path group (e.g., a group of timing paths), and a first portion of the entity may be active during the first portion of the test pattern. In another example, a second portion of the test pattern may involve a second timing path group (e.g., an internal path) different from the first timing path group, and a second portion of the entity may be active during the second portion of the test pattern, where the second portion of the entity is different from the first portion of the entity. In yet another example, the first portion of the test pattern may be identified as a first segment of the test pattern, and the second portion of the test pattern may be identified as a second segment of the test pattern.

In another embodiment, the one or more characteristics may include a location of one or more pins within the entity, a location of one or more channels within the entity, etc.

Further still, as shown in operation 104, an associated frequency is determined for each of the plurality of segments. In one embodiment, each of the plurality of segments may be individually analyzed to determine an associated frequency for the segment. In another embodiment, for each segment of the test pattern, timing paths used during the segment may be identified. For example, the timing paths may include a path within the entity being tested.

Also, in one embodiment, the timing paths used during the segment may be analyzed to determine the associated frequency for the segment. For example, various paths that are accessed/used within the entity being tested during the segment of the test pattern may be identified.

Additionally, in one embodiment, a design of the segment itself may be analyzed to determine the associated frequency for the segment. For example, one or more instructions within the segment may be identified, and these instructions may be analyzed to determine the associated frequency for the segment. In yet another example, an analysis module (e.g., a software module, a deep learning module, etc.) may take a segment as input and may provide an associated frequency for the segment as an output.

Further, in one embodiment, the associated frequency for a segment may include a speed at which information indicated within the segment (e.g., test signals, etc.) is provided by the testing environment to the entity being tested. In another embodiment, the associated frequency may be measured utilizing a predetermined reference unit (e.g., megahertz (mHz), etc.).

Further still, in one embodiment, each of the plurality of segments may have its own associated frequency. For example, a first segment may have a first associated frequency and a second segment may have a second associated frequency, where the first segment is different from the second segment, and the first frequency is different from the second frequency. In another example, although the first segment may be different from the second segment, the first frequency may be the same as the second frequency.

Also, as shown in operation 106, each of the plurality of segments and its associated frequency is provided to a testing environment. In one embodiment, each of the plurality of segments may be linked to its associated frequency. For example, the associated frequency for each segment may be stored with that segment.

In addition, in one embodiment, the plurality of segments (and their associated frequencies) may be linked together to form an updated test pattern. In another embodiment, within the updated test pattern, each of the plurality of segments may appear in the same order as they are found within the original test pattern. In yet another embodiment, within the updated test pattern, all or a portion of the plurality of segments may be arranged in a serial configuration and/or a parallel configuration. In yet another embodiment, the updated test pattern may be provided to the testing environment for implementation.

Furthermore, in one embodiment, each segment within the updated test pattern may indicate an order of signals to be sent to the entity being tested, as well as the associated frequency that the signals are to be sent. In another embodiment, in response to receiving the updated test pattern, for each segment, the testing environment may send test signals from the segment to the entity being tested with the associated frequency for the segment. In yet another embodiment, all or a portion of the plurality of segments within the updated test pattern may be run by the testing environment in a serial configuration and/or a parallel configuration.

Further still, in one embodiment, the testing environment may receive response signals from the entity being tested in response to sending the test signals. In another embodiment, the testing environment may compare the response signals to predetermined (e.g., threshold/expected) signals. In yet another embodiment, the testing environment may output a result signal that indicates a pass or fail condition. For example, a pass condition may occur when the response signals match the predetermined signals. In another example, a fail condition may occur when the response signals do not match the predetermined signals.

In this way, each of the plurality of segments may be implemented by the testing environment at its optimal corresponding frequency (e.g., the associated frequency for the segment). By adjusting the frequency for each segment instead of using a single frequency for the entire test pattern, a performance bottleneck may be eliminated, and a speed in which the test pattern is implemented may be increased. This may reduce an amount of time taken to test the functionality of an entity, which may improve a performance of the testing environment.

Also, in one embodiment, the test pattern may be provided from a local device (such as a single computer, server, workstation, etc.) to a remote device, where the remove device may be part of a distributed computing system (e.g., a computing node), a cloud computing environment (e.g., a cloud computing node), etc. The remote device may divide the test pattern into the plurality of segments, determine an associated frequency for each segment, and return the segments and their associated frequencies to the local device.

In another embodiment, the test pattern may be divided into a plurality of segments at the local device, and each of the segments may be sent to the remote device, where the remote device may determine an associated frequency for each segment and return the associated frequencies to the local device.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
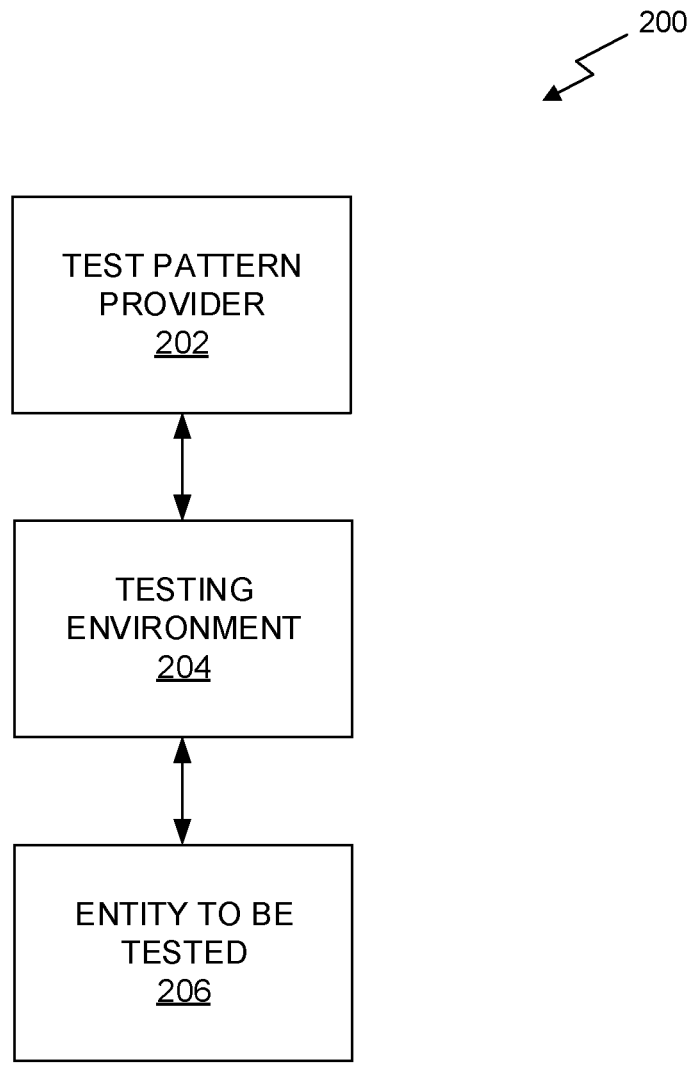
FIG. 2 illustrates an exemplary testing environment, in accordance with an embodiment.

FIG. 2 illustrates an exemplary testing environment 200, according to one embodiment. As shown, a test pattern provider 202 provides a test pattern to a testing environment 204. The test pattern provider 202 may include hardware or software separate from the testing environment 204 or integrated into the testing environment 204. In one embodiment, the test pattern may indicate an order and timing of signals to be sent from the testing environment 204 to an entity to be tested 206.

Additionally, in one embodiment, in response to receiving the test pattern from the test pattern provider 202, the testing environment 204 may send test signals to the entity to be tested 206 according to the test pattern. The signals may be sent with a frequency indicated within the test pattern. Additionally, the testing environment 204 may receive response signals from the entity to be tested 206 in response to sending the test signals.

Further, in one embodiment, the testing environment 204 may compare the response signals to predetermined (e.g., threshold/expected) signals, and may provide a result signal to the test pattern provider 202, where the result signal indicates a pass or fail condition.

In this way, the testing environment 204 may test the functionality of the entity to be tested 206, according to a test pattern provided by the test pattern provider 202.

Figure 3:
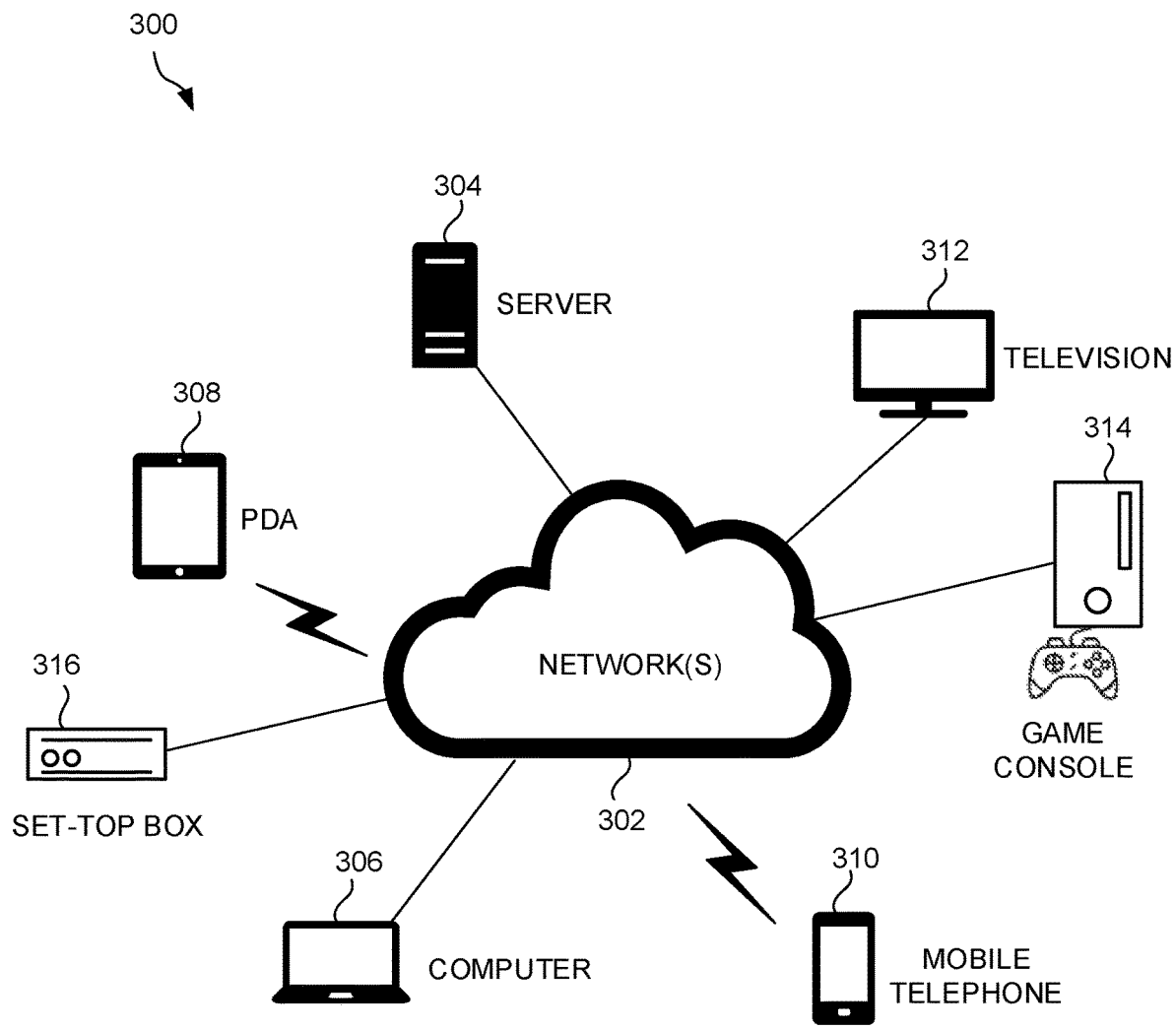
FIG. 3 illustrates a network architecture, in accordance with an embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, a game console 314, a television set-top box 316, etc.

Figure 4:
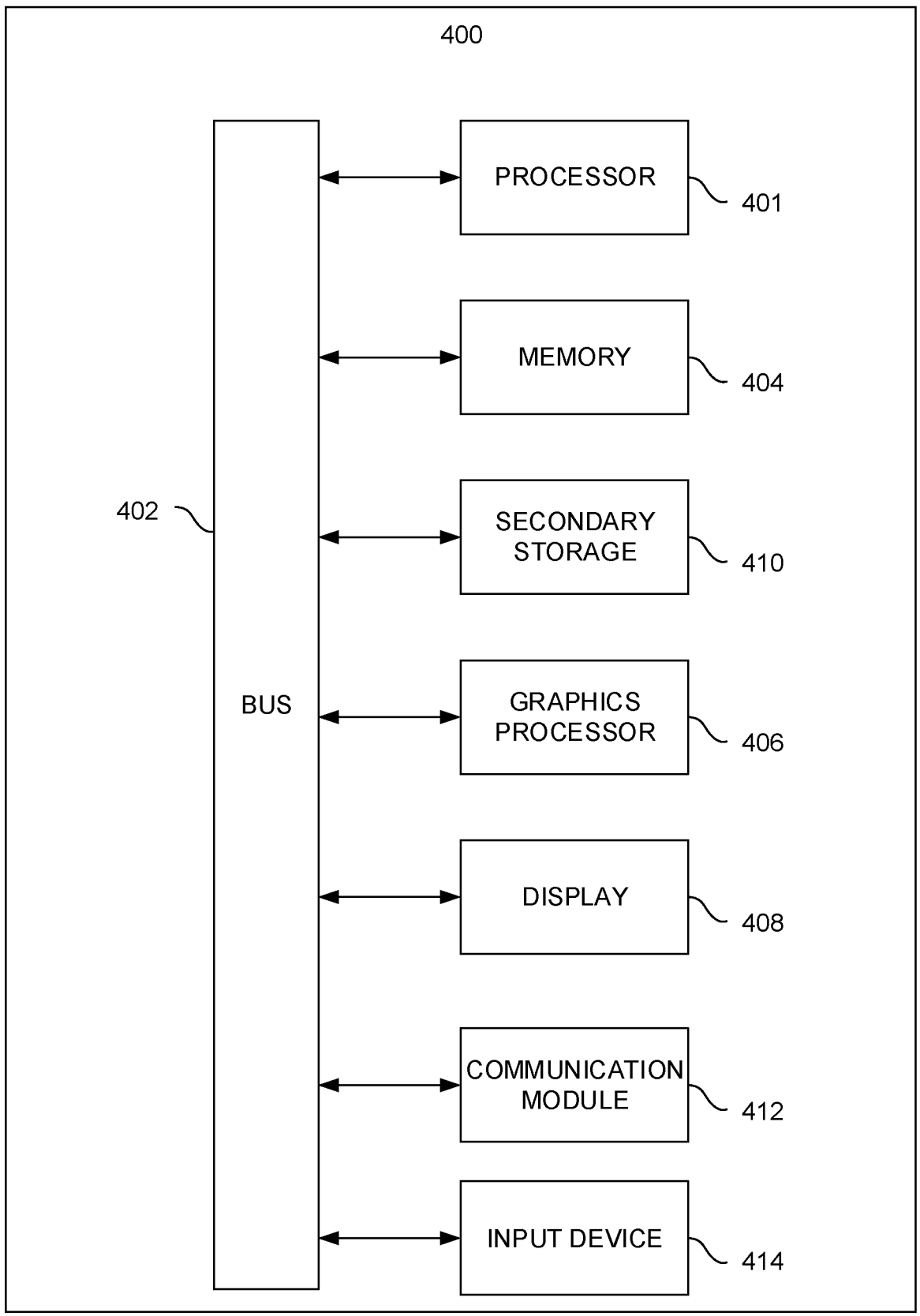
FIG. 4 illustrates an exemplary system, in accordance with an embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As also shown, the system 400 may include one or more input devices 414. The input devices 414 may be wired or wireless input device. In various embodiments, each input device 414 may include a keyboard, touch pad, touch screen, game controller (e.g. to a game console), remote controller (e.g. to a set-top box or television), or any other device capable of being used by a user to provide input to the system 400.

Figure 5:
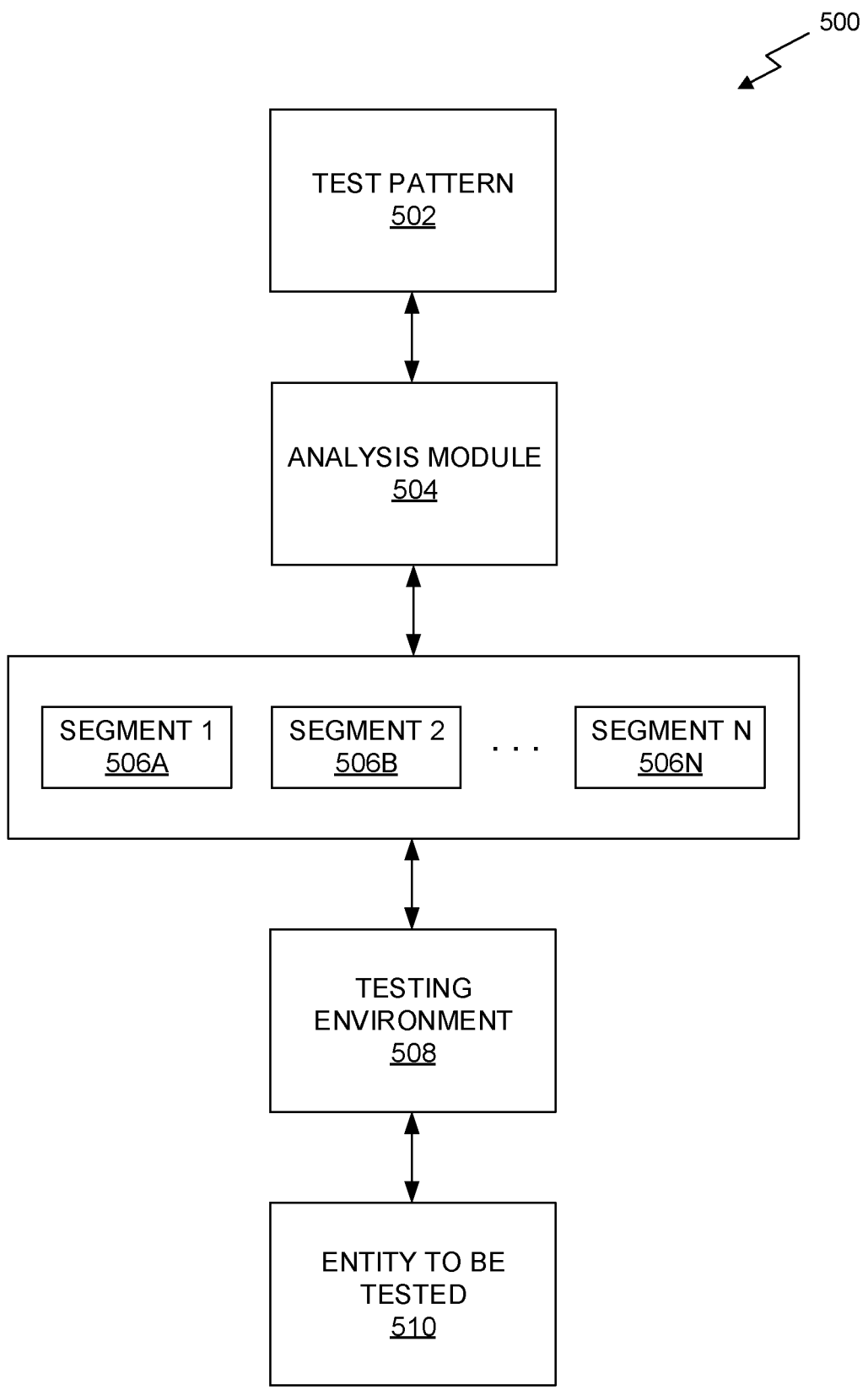
FIG. 5 illustrates an exemplary timing-aware testing environment, in accordance with an embodiment.

FIG. 5 illustrates an exemplary timing-aware testing environment 500, according to one embodiment. As shown, a test pattern 502 is provided (e.g., from a test pattern provider, etc.) to an analysis module 504. In one embodiment, a single associated frequency may be associated with the entire test pattern 502.

Additionally, in response to receiving the test pattern 502, the analysis module 504 divides the test pattern into a plurality of segments 506A-N, and determines an associated frequency for each of the plurality of segments 506A-N. In one embodiment, the plurality of segments 506A-N may include segments in a serial configuration, or segments in a parallel configuration. These segments and their associated frequencies are then provided from the analysis module 504 to a testing environment 508.

Further, in one embodiment, in response to receiving the plurality of segments 506A-N from the analysis module 504, the testing environment 508 may send test signals to the entity to be tested 510 according to the plurality of segments 506A-N. The signals may be sent with a frequency indicated within each of the plurality of segments 506A-N. Additionally, the testing environment 508 may receive response signals from the entity to be tested 510 in response to sending the test signals.

Also, in one embodiment, the plurality of segments 506A-N may be run by the testing environment 508 in a serial configuration or in a parallel configuration. Further, in one embodiment, the testing environment 508 may compare the response signals to predetermined (e.g., threshold/expected) signals, and may provide a result signal indicating a pass or fail condition.

In this way, a functionality of the entity to be tested 510 may be tested utilizing frequencies optimized for each of the plurality of segments 506A-N. This may improve a performance of the testing, reduce test times, etc.

Figure 6:
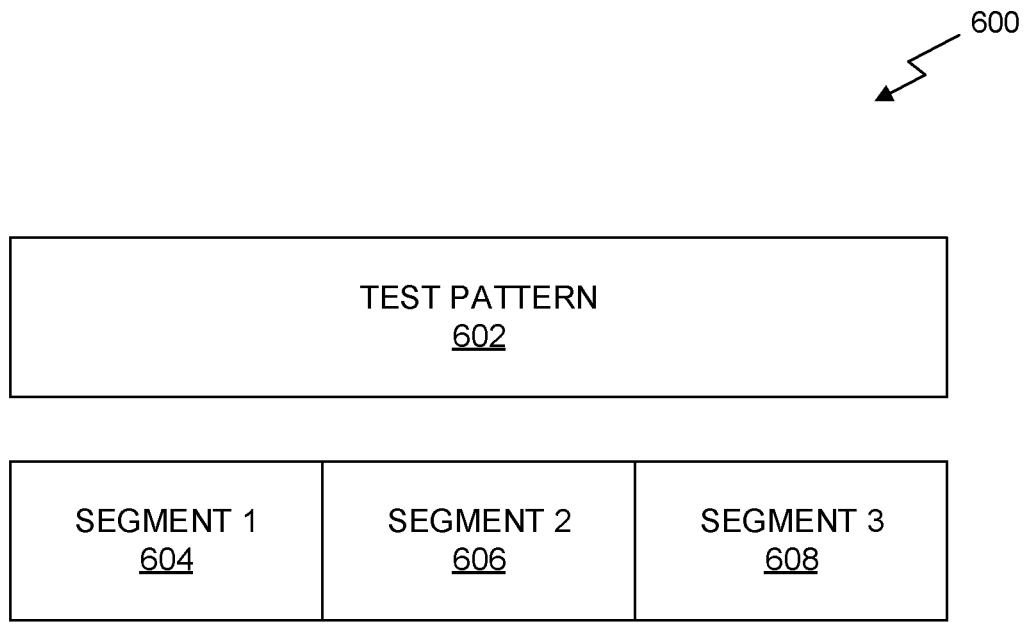
FIG. 6 illustrates exemplary frequency differences between an input test pattern and a segmented test pattern, in accordance with an embodiment.

FIG. 6 illustrates exemplary frequency differences 600 between an input test pattern 602 and a segmented test pattern, according to one embodiment. As shown, an input test pattern 602 has an associated frequency F1. For example, using the input test pattern 602, a testing environment may send test signals to an entity to be tested with the frequency F1 indicated by the input test pattern 602. The associated frequency F1 of the input test pattern may correspond to the slowest portion of the input test pattern 602.

However, the input test pattern 602 may be divided input a plurality of segments 604, 606, and 608 based on one or more characteristics of the input test pattern 602. Additionally, associated frequencies F1, F2, and F3 may be determined for each of the plurality of segments 604, 606, and 608, respectively. Each of the plurality of segments 604, 606, and 608 may be assigned their associated frequency.

For example, it may be determined that a first segment 604 includes the slowest portion of the input test pattern 602, and therefore has the same associated frequency F1 as the input test pattern 602. However, it may be determined that a second segment 606 includes faster portions of the input test pattern 602, and therefore has a second associated frequency F2 that is faster than the associated frequency F1 of the input test pattern 602. Likewise, it may be determined that a third segment 608 includes faster portions of the input test pattern 602, and therefore has a third associated frequency F3 that is faster than the associated frequency F1 of the input test pattern 602.

As a result, in response to receiving the input test pattern 602, a testing environment may send test signals for the entire input test pattern 602 at the frequency F1. However, in response to receiving the plurality of segments 604, 606, and 608, the testing environment may send test signals for each of the plurality of segments 604, 606, and 608 at their associated frequencies F1, F2, and F3. In this way, testing performed using the plurality of segments 604, 606, and 608 may be performed faster than testing performed using the input test pattern 602. This may improve a performance of the testing environment.

Timing Aware Test Application

Test patterns may include combinations of several segments. In each segment, data runs through different timing paths. In silicon testing, test patterns are run with a fixed frequency that is determined by the slowest segment; as a result, segments with better timing performance must run at a lower frequency within the test pattern. This leads to an increased test time and the possibility of missing timing-related defects during silicon testing.

In one embodiment, the test pattern may be separated into modular segments. The testing speed of these segments may be optimized and the testing may be run according to those optimized speeds instead of running the entire test with a fixed frequency.

To segment the test pattern, the entire test pattern may be evaluated and the segments may be identified based on characteristics such as the type of the segment (e.g., event or procedure based, etc.). Then the segments may be categorized into several groups by the data paths these segments run through, and the timing performance of each segment group may be extracted.

After all the analysis is completed, the corresponding maximum frequency may be assigned to each modular segment. As a result, the entire test may be run at its maximum speed. This may save testing time, and may decrease the potential for missing defects during the test.

Instead of running tests with a fixed frequency extracted for the whole test pattern, the test pattern may be decomposed into smaller segments that are then clustered into groups. A timing evaluation may be performed in each group to determine a frequency for the group, and the testing frequency may then be applied to the group.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Amended claims follow:

1. A method, comprising:
    determining a plurality of timing paths used during a test pattern, wherein each timing path of the plurality of timing paths is a different path within an entity to be tested using the test pattern,
    dividing the test pattern into a plurality of segments, wherein each segment of the plurality of segments corresponds with a timing path of the plurality of timing paths;
    determining an associated frequency for each segment of the plurality of segments; and
    providing each segment of the plurality of segments and its associated frequency to a testing environment.

2. The method of claim 1, wherein the test pattern includes instructions that indicate procedures to be performed by the testing environment during a test of a functionality of the entity.

3. The method of claim 1, wherein the test pattern is associated with a single predetermined frequency.

4. The method of claim 1, wherein the testing environment includes a hardware tester that tests the functionality of the entity, and wherein the entity is a manufactured silicon chip.

5. The method of claim 1, wherein each segment of the plurality of segments is individually analyzed to determine the associated frequency for the segment.

6. The method of claim 1, wherein for each segment of the plurality of segments, one of the plurality of timing paths used during the segment and a design of the segment is analyzed to determine the associated frequency for the segment.

7. The method of claim 1, wherein the associated frequency for a segment of the plurality of segments includes a speed at which information indicated within the segment is provided by the testing environment to the entity being tested.

8. The method of claim 1, wherein a first segment of the plurality of segments has a first frequency, and a second segment of the plurality of segments has a second frequency, where the first segment is different from the second segment, and the first frequency is different from the second frequency.

9. The method of claim 1, wherein the plurality of segments and their associated frequencies are linked together to form an updated test pattern that is provided to the testing environment for implementation.

10. The method of claim 1, wherein in response to receiving the plurality of segments, for each segment, the testing environment sends test signals from the segment with the associated frequency for the segment.

11. The method of claim 1, further comprising running, by the testing environment, all or a portion of the plurality of the segments in a serial configuration.

12. The method of claim 1, further comprising running, by the testing environment, all or a portion of the plurality of the segments in a parallel configuration.

13. The method of claim 1, wherein the different path within the entity to be tested is a path between two functional components of the entity.

14. The method of claim 13, wherein each functional component of the two functional components includes one of:
    an internal register,
    an output of the entity, or
    an input of the entity.

15. The method of claim 1, wherein the plurality of timing paths include portions of the entity that are active during testing using a respective segment of the plurality of segments of the test pattern.

16. The method of claim 1, further comprising:
    categorizing the plurality of segments into a plurality of groups by their corresponding timing path of the plurality of timing paths; and
    wherein determining an associated frequency for each segment of the plurality of segments includes determining a frequency for each group of the plurality of groups.

17. The method of claim 1, wherein the associated frequency for each segment of the plurality of segments is determined by analyzing the timing path corresponding to the segment.

18. The method of claim 1, wherein the associated frequency for each segment of the plurality of segments is determined by analyzing one or more instructions within the segment.

19. The method of claim 1, wherein the associated frequency for each segment of the plurality of segments is determined using deep learning that takes the segment as an input and provides the associated frequency for the segment as an output.

20. A system, comprising:
    a processor executed to perform a method comprising:
    determining a plurality of timing paths used during a test pattern, wherein each timing path of the plurality of timing paths is a different path within an entity to be tested using the test pattern,
    dividing the test pattern into a plurality of segments, wherein each segment of the plurality of segments corresponds with a timing path of the plurality of timing paths;
    determining an associated frequency for each segment of the plurality of segments; and
    providing each segment of the plurality of segments and its associated frequency to a testing environment.

21. The system of claim 20, wherein the test pattern includes instructions that indicate procedures to be performed by the testing environment during a test of a functionality of the entity.

22. The system of claim 20, wherein the test pattern is associated with a single predetermined frequency.

23. The system of claim 20, wherein the testing environment includes a hardware tester that tests the functionality of the entity, and wherein the entity is a manufactured silicon chip.

24. A non-transitory computer-readable media storing computer instructions which when executed by one or more processors cause the one or more processors to perform a method comprising:
    determining a plurality of timing paths used during a test pattern, wherein each timing path of the plurality of timing paths is a different path within an entity to be tested using the test pattern,
    dividing the test pattern into a plurality of segments, wherein each segment of the plurality of segments corresponds with a timing path of the plurality of timing paths;
    determining an associated frequency for each segment of the plurality of segments; and
    providing each segment of the plurality of segments and its associated frequency to a testing environment.

25. The non-transitory computer-readable media of claim 24,
    wherein the test pattern includes instructions that indicate procedures to be performed by the testing environment during a test of a functionality of the entity.

* * * * *